(12) United States Patent  
Itamura

(10) Patent No.: US 8,004,820 B2
(45) Date of Patent: Aug. 23, 2011

(54) CERAMIC ELECTRONIC COMPONENT, METHOD OF MANUFACTURING THE SAME, AND COLLECTIVE COMPONENT

(75) Inventor: Hiroto Itamura, Echizen (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 287 days.

(21) Appl. No.: 12/464,197

(22) Filed: May 12, 2009

(65) Prior Publication Data

US 2009/0284897 A1 Nov. 19, 2009

(30) Foreign Application Priority Data

May 14, 2008 (JP) .................. 2008-126654
Feb. 25, 2009 (JP) .................. 2009-041727

(51) Int. Cl.
*H01G 4/228* (2006.01)
(52) U.S. Cl. ............ 361/306.3; 361/311; 361/313; 361/308.1; 361/309; 361/321.2
(58) Field of Classification Search ........... 361/306.3, 361/306.1, 311–313, 308.1, 309, 301.2, 301.4, 361/303–305, 321.1, 321.2
See application file for complete search history.

(56) References Cited

U.S. PATENT DOCUMENTS

| 6,310,757 | B1 * | 10/2001 | Tuzuki et al. ............. 361/308.1 |
| 6,381,118 | B1 * | 4/2002 | Yokoyama et al. ......... 361/308.1 |
| 6,771,485 | B2 * | 8/2004 | Yokoyama et al. ........... 361/309 |
| 7,054,136 | B2 * | 5/2006 | Ritter et al. ................... 361/309 |
| 7,808,770 | B2 * | 10/2010 | Itamura et al. ............... 361/309 |
| 2009/0284897 | A1 | 11/2009 | Itamura | |

FOREIGN PATENT DOCUMENTS

| JP | 06-087085 A | 3/1994 |
| JP | 09-260187 | 10/1997 |
| JP | 2003-273272 | 9/2003 |
| JP | 2005-064446 | 3/2005 |
| JP | 2005-079427 | 3/2005 |
| JP | 2005-086131 A | 3/2005 |
| JP | 2006-216622 | 8/2006 |
| JP | 2006-339337 | 12/2006 |
| JP | 2009-302509 A | 12/2009 |

* cited by examiner

*Primary Examiner* — Nguyen T Ha
(74) *Attorney, Agent, or Firm* — Dickstein Shapiro LLP

(57) ABSTRACT

A collective component has a first region that intersects a conductive paste film for external terminal electrodes in a break line in which break leading holes are arranged and a second region that does not intersect a conductive paste film for external terminal electrodes in the break line. The first break leading holes are formed in the first region so as not to reach the second region. The second break leading holes are formed only in the second region or from the second region to a portion of the first region. The pitch of the first break leading holes is wider than the pitch of the second break leading holes.

19 Claims, 17 Drawing Sheets

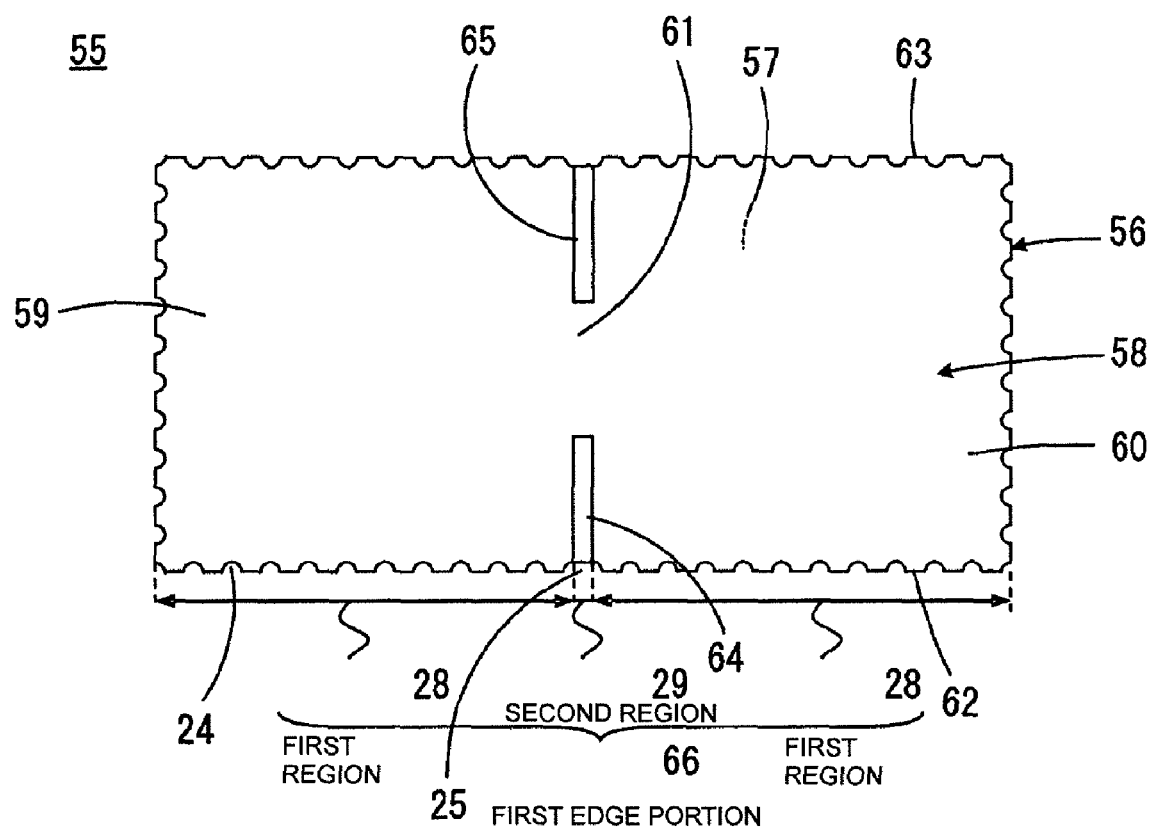

CERAMIC ELECTRONIC COMPONENT, METHOD OF MANUFACTURING THE SAME, AND COLLECTIVE COMPONENT

BACKGROUND OF THE INVENTION

1. Field of the Invention

The invention relates to a ceramic electronic component, a method of manufacturing the same, and a collective component and, more particularly, to a ceramic electronic component in which an external conductor, such as an external terminal electrode, is formed on a principal surface and which is obtained by breaking a collective component along a predetermined break line, a method of manufacturing the same, and a collective component from which a plurality of ceramic electronic components may be obtained by dividing the collective component.

2. Description of the Related Art

In recent years, a large number of monolithic ceramic electronic components, typically, monolithic ceramic capacitors, are used in electronic apparatuses, such as cellular phones and personal computers. Generally, the monolithic ceramic electronic component includes a rectangular parallelepiped ceramic element assembly and a pair of external terminal electrodes formed on an outer surface of the ceramic element assembly. The external terminal electrodes are mostly formed in such a manner that conductive paste is applied to end portions of the ceramic element assembly by an immersion method and is baked. In this case, each external terminal electrode is formed to extend over five surfaces in total with one end surface of the ceramic element assembly as a center.

In recent years, there had been an increase in the demand for electronic components for specialized applications, and the like, and the shape and arrangement of the external terminal electrodes of the ceramic electronic component have become progressively diversified. For example, Japanese Unexamined Patent Application Publication No. 2006-216622 and Japanese Unexamined Patent Application Publication No. 2006-339337 suggest a type in which external terminal electrodes are formed on one surface or two opposite surfaces of the ceramic element assembly.

In this way, it is possible to form the external terminal electrodes by methods other than the immersion method when the external terminal electrodes are formed on one surface or two opposite surfaces of the ceramic element assembly. For example, there is a method where a conductive paste film for external terminal electrodes is printed on a principal surface of a collective component that constitutes a plurality of ceramic element assemblies for a plurality of ceramic electronic components and is baked, and then the collective component is divided to obtain the ceramic element assemblies for individual ceramic electronic components, which is, for example, described in Japanese Unexamined Patent Application Publication No. 9-260187 (particularly, at paragraph [0003]).

Because the collective component to be divided is formed of sintered hard ceramics, if a cutter, such as a dicer, is used to divide the collective component, there is a possibility that a crack or a chip may occur in the ceramic element assembly of each ceramic electronic component. To solve the above problem, Japanese Unexamined Patent Application Publication No. 9-260187 suggests that the unfired collective component is press-cut by a plate-like cutting blade. However, there is a problem that in this method, raw chips tend to stick one another after cutting.

Another conceivable method is a break method that is often used in manufacturing a ceramic multilayer board, or the like. In the break method, a break groove is formed in an unfired collective component, and, after firing, a collective component is divided along the break groove. Thus, the problem when a dicer or a plate-like cutting blade is used as described above is avoided. In addition, it is excellent in production efficiency as well because a plating process or a measurement process may be performed on the collective component.

Various break methods have been suggested. Among others, the break method described in Japanese Unexamined Patent Application Publication No. 2003-273272 is attractive. According to a technique described in Japanese Unexamined Patent Application Publication No. 2003-273272, by forming discontinuous linear break grooves, it is possible to prevent the occurrence of an undesirable crack in a collective component when subsequently handling the collective component in other processes.

On the other hand, it has been suggested in recent years to bury a ceramic electronic component inside the multilayer wiring board in order to miniaturize a multilayer wiring board. For example, Japanese Unexamined Patent Application Publication No. 2005-064446 describes a method of manufacturing a laminating module, which includes processes in which, when a ceramic electronic component is buried inside a board, the ceramic electronic component is accommodated in a core board so that an external terminal electrode formed on a principal surface of the ceramic electronic component is, for example, positioned to face upward, an insulating layer is formed so as to cover the core board and the ceramic electronic component, the insulating layer is punctured by a laser beam to form a via hole that reaches the surface of the external terminal electrode, and then the via hole is filled with a conductor to electrically connect a wiring circuit with the external terminal electrode.

In the above burial, accurate laser beam irradiation is required. This is because there is a possibility that the characteristics of the ceramic electronic component are changed if a laser beam is not carefully irradiated on the ceramic element assembly.

Thus, the area of the external terminal electrode of the buried ceramic electronic component is desirably as large as possible. For example, it is necessary to design external terminal electrodes 2 and 3 in the monolithic ceramic electronic component of a type described in Japanese Unexamined Patent Application Publication No. 2006-216622 and Japanese Unexamined Patent Application Publication No. 2006-339337, as shown in FIG. 17, so as to increase the areas thereof as much as possible with leaving only a necessary gap 1.

However, when the method of breaking along a predetermined break line in which the break grooves are formed by discontinuous perforations is used to manufacture the ceramic electronic components in which a plurality of external terminal electrodes having narrow gaps in between them are formed as described above, it is found that a "break defect" tends to occur. The "break defect" is such that a portion of a side surface of a ceramic element assembly, formed by the breaking, has a portion which is not broken properly, and, therefore, a protrusion (dent at the opposite side) is formed at the side surface or a crack or a chip occurs in the ceramic element assembly starting from the gap portion.

When discontinuous equal-sized recesses for leading a break are formed at an equal pitch, as described in Japanese Unexamined Patent Application Publication No. 2003-273272, it is highly likely that no recess which can lead the break is formed at a narrow gap portion and two adjacent recesses for leading the break are arranged so as to place the gap portion in between them. In this case, it is easy to concentrate tensile stress between adjacent recesses for leading a break in external terminal electrode forming portions that occupy the majority of the principal surface, whereas it is difficult to concentrate tensile stress on a gap portion that has a narrow area and that is located at a level slightly lower than the external terminal electrode forming portion. For this reason, it is predictable that a "break defect" tends to occur starting from the gap portion.

SUMMARY OF THE INVENTION

It is an object of the invention to provide a ceramic electronic component, a method of manufacturing the same, and a collective component from which a plurality of ceramic electronic components may be obtained, which are able to eliminate the above described problems.

According to preferred embodiments of the invention, a ceramic electronic component includes: a ceramic element assembly that has mutually opposite first and second principal surfaces and first to fourth side surfaces that connect the first and second principal surfaces; and an external conductor that is formed at least on the first principal surface of the ceramic element assembly.

In the ceramic electronic component, a plurality of recessed grooves are formed at least on the first side surface so as to extend in a direction to connect the first and second principal surfaces and at least reach the first principal surface. Note that these recessed grooves correspond to halves of break leading holes provided along a predetermined break line so as to lead a break in a collective component.

A first edge portion of the first principal surface, which contacts the first side surface, has at least two first regions in which an edge of the external conductor is located; and at least one second region which is located between adjacent first regions and in which the edge of the external conductor is not located.

In a first aspect of the preferred embodiments of the invention, the plurality of recessed grooves include a plurality of first recessed grooves that are formed at a predetermined pitch in the at least two first regions so as not to reach the at least one second region; and a plurality of second recessed grooves that are formed at a predetermined pitch only in the at least one second region or from the at least one second region to a portion of the at least two first regions, and, where the pitch of the first recessed grooves is $P_1$, and the pitch of the second recessed grooves is $P_2$, the relationship $P_1 > P_2$ is satisfied.

In this first aspect, the adjacent second recessed grooves may overlap each other or may be independent of each other.

In a second aspect of the preferred embodiments of the invention, the plurality of recessed grooves include a plurality of first recessed grooves that are formed in the at least two first regions so as not to reach the at least one second region; and at least one second recessed groove that is formed in the at least one second region, and, where the length of each of the plurality of first recessed grooves along the first edge portion is $D_1$, and the length of the at least one second recessed groove along the first edge portion is $D_2$, the relationship $D_1 < D_2$ is satisfied.

In the preferred embodiments of the invention, the external conductor includes a first external conductor the edge of which is located in any one of the at least two first regions, and a second external conductor the edge of which is located in the other one of the at least two first regions, and the first external conductor and the second external conductor are formed on the first principal surface independently of each other.

In the above preferred embodiments, when the ceramic electronic component according to the preferred embodiments of the invention constitutes a monolithic ceramic capacitor that includes a plurality of laminated dielectric layers and first and second internal electrodes that are provided so as to face each other via each of the dielectric layers, the first external conductor is electrically connected to the first internal electrode, and the second external conductor is electrically connected to the second internal electrode.

When the ceramic electronic component constitutes a monolithic ceramic capacitor, as described above, the dielectric layers and the first and second internal electrodes may extend vertically with respect to the first principal surface or may extend parallel to the first principal surface. In the latter case, the first external conductor is electrically connected to each first internal electrode through a first via conductor, and the second external conductor is electrically connected to each second internal electrode through a second via conductor.

In the ceramic electronic component according to the preferred embodiments of the invention, the plurality of recessed grooves may be formed so as to reach both the first and second principal surfaces or may be formed so as to reach only the first principal surface.

In addition, the pitch between the second recessed groove and the first recessed groove, which are located adjacent to each other, is desirably smaller than the pitch of the first recessed grooves.

The preferred embodiments of the invention may also be applied to a ceramic electronic component in which the external conductor is additionally formed on the second principal surface.

In the ceramic electronic component according to the preferred embodiments of the invention, a second edge portion of the first principal surface, which contacts the second side surface facing the first side surface, may also have a similar configuration to the first edge portion.

When the ceramic electronic component according to the preferred embodiments of the invention is buried in a wiring board and a conductor that fills a via hole formed by a laser beam to reach the external conductor is formed in the wiring board, at least a surface of the external conductor is desirably made of Cu.

Preferred embodiments of the invention are also directed to a method of manufacturing the above described ceramic electronic component.

According to the preferred embodiments of the invention, the method of manufacturing a ceramic electronic component includes: preparing a collective component that has mutually opposite first and second principal surfaces, in which an external conductor is formed at least on the first principal surface, a plurality of break leading holes are formed so as to extend in a direction to connect the first and second principal surfaces, each of the break leading holes has an open end located at least on the first principal surface, and the plurality of break leading holes are arranged so as to be distributed along a predetermined break line; and obtaining a plurality of ceramic electronic components by dividing the collective component along the break line.

Note that it is only necessary that each of the break leading holes has an open end that is located at least on the first principal surface. Thus, each of the break leading holes may be formed of a through-hole portion that has an open end on each of the first and second principal surfaces and extends through the collective component in the thickness direction or may be formed of a recessed portion that has an open end only on the first principal surface and that does not extends through the collective component in the thickness direction.

The collective component, when viewed from a side of the first principal surface, has a first region that intersects with the external conductor in the break line and a second region that does not intersect with the external conductor in the break line.

When the ceramic electronic component according to the above described first aspect is manufactured, the plurality of break leading holes include a plurality of first break leading holes that are formed in the first region so as not to reach the second region and a plurality of second break leading holes that are formed at a predetermined pitch only in the second region or from the second region to a portion of the first region, and the pitch of the first break leading holes is wider than the pitch of the second break leading holes.

On the other hand, when the ceramic electronic component according to the second aspect is manufactured, the plurality of break leading holes include a plurality of first break leading holes that are formed in the first region so as not to reach the second region and at least one second break leading hole that is formed in the second region, and the length of the at least one second break leading hole along the break line is longer than the length of each of the first break leading holes along the break line.

The preferred embodiments of the invention may also be directed to a collective component that is advantageously used in the above described method of manufacturing a ceramic electronic component, more specifically, a collective component from which a plurality of ceramic electronic components may be obtained by dividing the collective component along a predetermined break line.

The collective component according to the preferred embodiments of the invention includes: mutually opposite first and second principal surfaces; and an external conductor that is formed at least on the first principal surface, wherein a plurality of break leading holes are formed so as to extend in a direction to connect the first and second principal surfaces. Each of the break leading holes has an open end that is located at least on the first principal surface. The plurality of break leading holes are arranged to be distributed along the break line.

The collective component, when viewed from a side of the first principal surface, has a first region that intersects with the external conductor in the break line and a second region that does not intersect with the external conductor in the break line.

In the collective component for obtaining the ceramic electronic component according to the above described first aspect, the plurality of break leading holes include a plurality of first break leading holes that are formed in the first region so as not to reach the second region and a plurality of second break leading holes that are formed at a predetermined pitch only in the second region or from the second region to a portion of the first region, and the pitch of the first break leading holes is wider than the pitch of the second break leading holes.

On the other hand, the plurality of break leading holes in the collective component for obtaining the ceramic electronic component according to the above described second aspect include a plurality of first break leading holes that are formed in the first region so as not to reach the second region and at least one second break leading hole that is formed in the second region, and the length of the at least one second break leading hole along the break line is longer than the length of each of the first break leading holes along the break line.

According to the preferred embodiments of the invention, when a collective component is broken along a predetermined break line in which a plurality of break leading holes are arranged in order to obtain a ceramic electronic component in which an edge portion of a principal surface of a ceramic element assembly has at least two first regions in which an edge of an external conductor is located and at least one second region which is located between the adjacent two first regions and in which no edge of the external conductor is located, like a ceramic electronic component in which a plurality of external terminal electrodes having narrow gaps are formed on a principal surface, for example, a smooth break is possible, and "break defects", such as occurrence of a protrusion or a dent at a side surface of the ceramic element assembly or occurrence of a crack or a chip in the ceramic element assembly, hardly occurs.

Accordingly, when the ceramic electronic component is contained inside a wiring board so that the external conductor formed on the principal surface of the ceramic electronic component, for example, faces upward, part of the wiring board is perforated by a laser beam to form a via hole that reaches the surface of the external conductor, and then the via hole is filled with a conductor. In carrying out a process of electrically connecting a wiring circuit to the external conductor, even when the area of the external conductor of the buried ceramic electronic component is increased in order to avoid the need for high accuracy in laser beam irradiation, it is possible to smoothly and favorably break a collective component for obtaining such an electronic component.

Other features, elements, characteristics and advantages of the present invention will become more apparent from the following detailed description of preferred embodiments of the present invention (with reference to the attached drawings).

BRIEF DESCRIPTION OF THE DRAWINGS

FIG. 3A and FIG. 3B are LT cross-sectional views of the monolithic ceramic capacitor 11 shown in FIG. 1, in which FIG. 3A shows a cross section in which a first internal electrode 31 is present, and FIG. 3B shows a cross section in which a second internal electrode 32 is present;

FIG. 12A and FIG. 12B are views, corresponding to FIG. 3A and FIG. 3B, for illustrating a sixth embodiment of the invention, in which FIG. 12A shows a cross section in which a first internal electrode 31 is present, and FIG. 12B shows a cross section in which a second internal electrode 32 is present;

FIG. 14A and FIG. 14B are LW cross-sectional views of the monolithic ceramic capacitor 11f shown in FIG. 13, in which FIG. 14A shows a cross section in which a first internal electrode 31 is present, and FIG. 14B shows a cross section in which a second internal electrode 32 is present;

FIG. 15 is a view, corresponding to FIG. 1, for illustrating an eighth embodiment of the invention;

DESCRIPTION OF THE PREFERRED EMBODIMENTS

Figure 1:
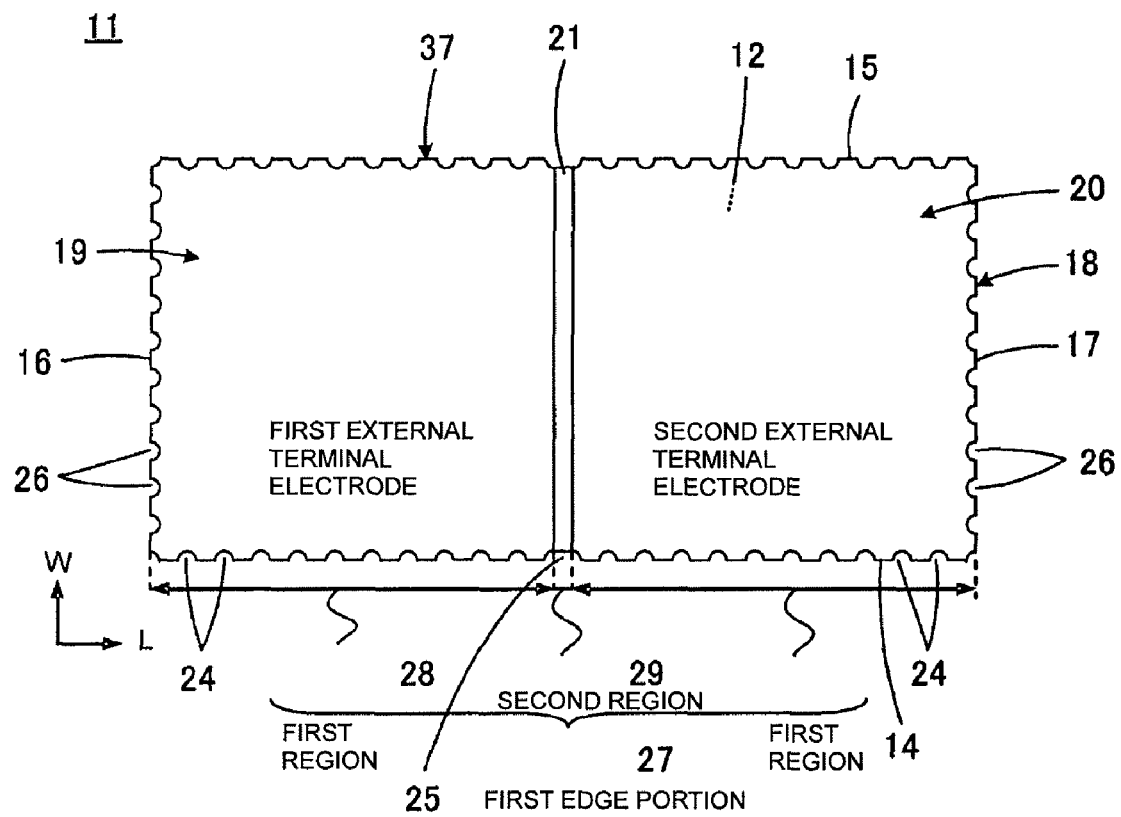
FIG. 1 is a plan view that shows a monolithic ceramic capacitor 11, which is a ceramic electronic component according to a first embodiment of the invention.
Figure 2:
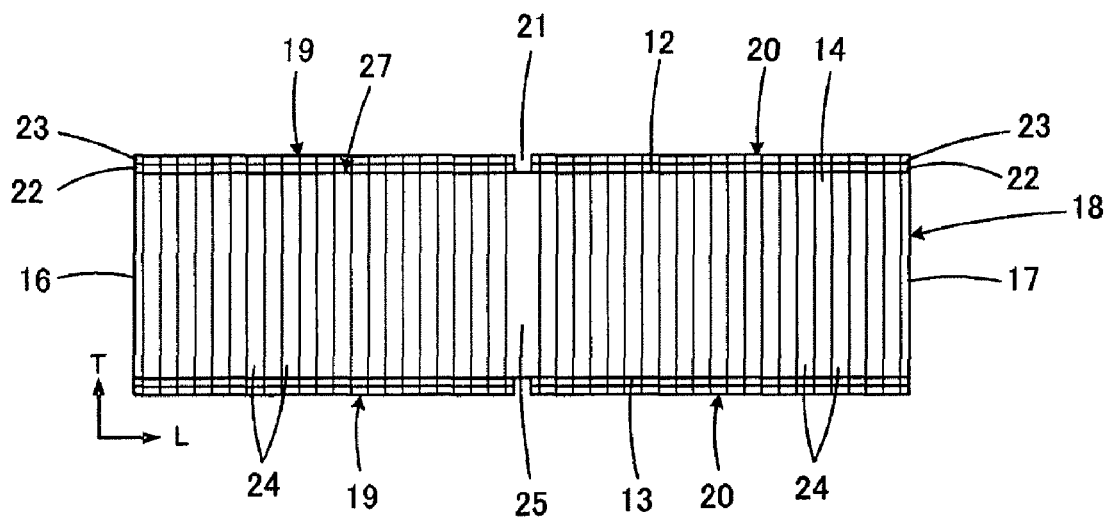
FIG. 2 is a front view of the monolithic ceramic capacitor 11 shown in FIG. 1.
Figure 3:
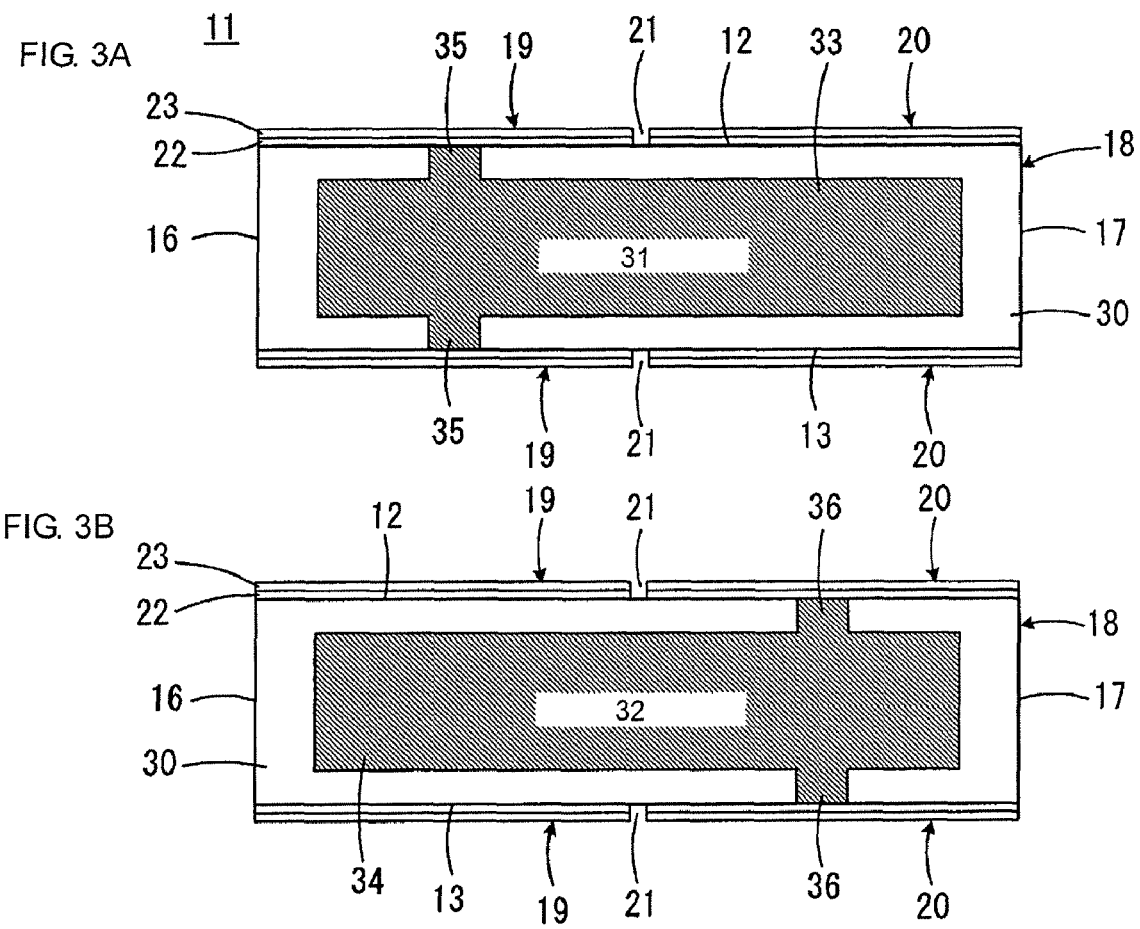
Figure 4:
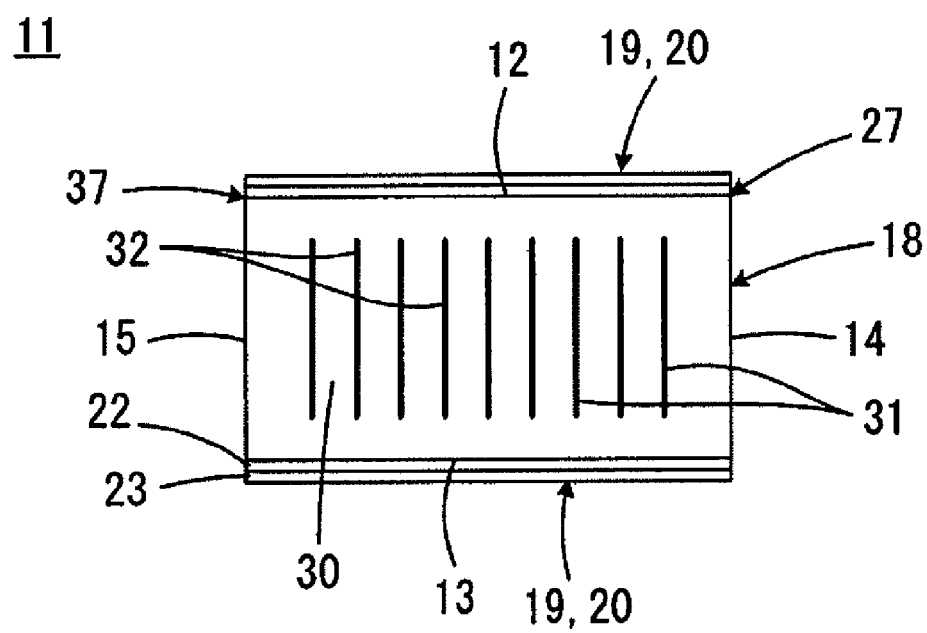
FIG. 4 is a WT cross-sectional view of the monolithic ceramic capacitor 11 shown in FIG. 1.

FIG. 1 to FIG. 4 show a monolithic ceramic capacitor 11, which serves as a ceramic electronic component according to a first embodiment of the invention. Here, FIG. 1 is a plan view. FIG. 2 is a front view. FIG. 3A, FIG. 3B and FIG. 4 are cross-sectional views. Note that in FIG. 1 and FIG. 2, L, W and T respectively indicate a longitudinal direction, a width direction and a thickness direction. FIG. 3A and FIG. 3B are LT cross-sectional views. FIG. 4 is a WT cross-sectional view. In addition, FIG. 3A and FIG. 3B are different cross sections.

As shown in FIG. 1 and FIG. 2, the monolithic ceramic capacitor 11 includes a capacitor body 18, which serves as a ceramic element assembly, having mutually opposite first and second principal surfaces 12 and 13 and first to fourth side surfaces 14 to 17 that connect the first and second principal surfaces 12 and 13.

In addition, first and second external terminal electrodes 19 and 20, which serve as external conductors, are independently formed on the first principal surface 12 of the capacitor body 18 separated by a gap 21, and first and second external terminal electrodes 19 and 20 are similarly formed on the second principal surface 13 as well. The first and second external terminal electrodes 19 and 20 each include a base layer 22 and a plating film 23 formed on the base layer 22.

In addition, a plurality of recessed grooves 24 and 25 are formed on each of the first and second side surfaces 14 and 15 of the capacitor body 18. The recessed grooves 24 and 25 are formed so as to extend in a direction to connect the first and second principal surfaces 12 and 13 and reach both the first and second principal surfaces 12 and 13. Recessed grooves 26 are also formed on the third and fourth side surfaces 16 and 17 of the capacitor body 18.

In addition, two first regions 28 and one second region 29 are formed at a first edge portion 27 of the first principal surface 12, which contacts the first side surface 14. An edge of the first or second external terminal electrode 19 or 20 is located in each of the first regions 28. The second region 29 is located between the adjacent two first regions 28, and neither an edge of the first external terminal electrode 19 nor an edge of the second external terminal electrode 20 is located in the second region 29.

As shown in FIG. 3A, FIG. 3B and FIG. 4, the monolithic ceramic capacitor 11 includes a plurality of laminated dielectric layers 30 and a plurality of pairs of first and second internal electrodes 31 and 32 that are provided so as to face each other via each of the dielectric layers 30. In this embodiment, the dielectric layers 30 and the first and second internal electrodes 31 and 32 extend vertically with respect to the first principal surface 12, that is, with respect to a mounting surface. The first and second internal electrodes 31 and 32 respectively have capacitive portions 33 and 34 and extended portions 35 and 36, and are electrically connected to the first and second external terminal electrodes 19 and 20, respectively.

Figure 5:
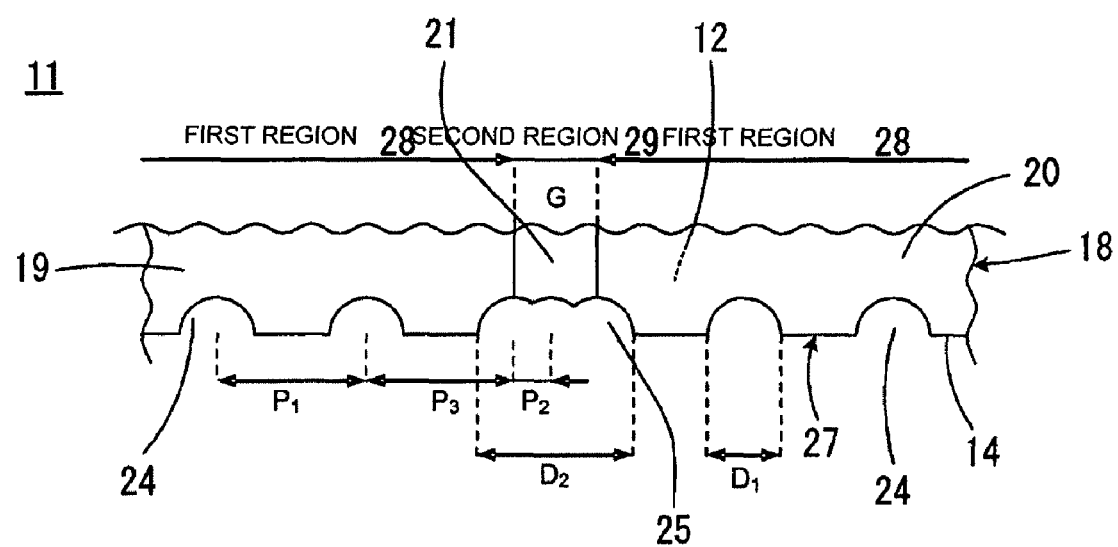
FIG. 5 is a partially enlarged view of FIG. 1.

FIG. 5 is a partially enlarged view of FIG. 1. As best seen in FIG. 5, the above described plurality of recessed grooves 24 and 25 are classified into the plurality of first recessed grooves 24 and the plurality of second recessed grooves 25.

The first recessed grooves 24 are formed in the first regions 28 so as not to reach the second region 29. Each first recessed groove 24 has a substantially semicircular shape having a length of $D_1$ along the first edge portion 27, and the plurality of first recessed grooves 24 are arranged at an equal pitch $P_1$. Here, the pitch means the distance between median points of the adjacent recessed grooves 24 along the first edge portion 27. Note that the shape of each first recessed groove 24 is not limited to the substantially semicircular shape shown in the drawing, and may be substantially triangular, rectangular, oblong, or the like.

The second recessed grooves 25 are formed in the second region 29. Particularly, the second recessed grooves 25 in this embodiment are formed over the entire second region 29 so as to partially reach the adjacent first regions from the second region 29. The second recessed grooves 25 have a length of $D_2$ along the first edge portion 27, and are continuously arranged at a pitch $P_2$ so that three substantially semicircular recessed grooves 25 having the same area partially overlap each other. Note that, for the sake of convenience, one recessed groove formed of mutually overlapped and continuous plurality of recessed grooves is regarded as a plurality of recessed grooves. The shape of each second recessed groove 25 is not limited to the substantially semicircular shape shown in the drawing, and it may be substantially triangular, rectangular, oblong, or the like.

Where the pitch of the adjacent first recessed grooves 24 is $P_1$, and the pitch of the adjacent second recessed grooves 25 is $P_2$, the relationship $P_1 > P_2$ is satisfied. The first and second recessed grooves 24 and 25 correspond to half of break leading holes 48 and 49 (see FIG. 7) after a breaking process in a manufacturing process, which will be described later. In this way, the pitch of break leading holes is reduced in the second region 29 that corresponds to the gap 21 portion between the first and second external terminal electrodes 19 and 20. Thus, a smooth break is possible, and it is possible to reliably suppress structural defect.

Note that the pitch $P_3$ between one first recessed groove 24 and the adjacent second recessed groove 25 desirably satisfies the relationship $P_1 \geqq P_3$. By so doing, the break leading holes concentrate around the second recessed groove 25, so a further smooth break is possible.

Beyond the foregoing, preferred conditions related to the dimensions are as follows.

The length $D_1$ between the extremities of each first recessed groove 24 is desirably about 80 to 120 μm.

The length $D_2$ between the extremities of the plurality of mutually overlapped continuous second recessed grooves 25 is desirably about 160 to 240 μm.

The pitch $P_1$ of the first recessed grooves 24 is desirably about 150 to 250 μm.

The pitch $P_2$ of the plurality of mutually overlapped continuous second recessed grooves 25 is desirably about 40 to 60 μm.

The pitch $P_3$ between the adjacent first recessed groove 24 and second recessed groove 25 is desirably about 150 to 250 μm.

The recessed grooves 26 formed at the third side surface 16 of the capacitor body 18 and the recessed grooves 26 formed at the fourth side surface 17 of the capacitor body 18 are desirably arranged at substantially equal pitch, respectively.

The size G of the gap 21, which corresponds to the length of the second region 29, is desirably about 140 to 160 μm.

It is desirable that $D_1 < G$, and that $D_2 \geqq G$.

In this embodiment, the first and second regions 28 and 29 are also present in a second edge portion 37, as well as the first edge portion 27, of the first principal surface 12, which contacts the second side surface 15 facing the first side surface 14, the first and second recessed grooves 24 and 25 satisfy a relationship similar to that of the first edge portion 27. However, the embodiment of the invention may be applied to an edge portion at which the second region is present, and it is only necessary that at least one edge portion satisfies the above described relationship.

In addition, the arrangement of the first and second external terminal electrodes 19 and 20, first recessed grooves 24, second recessed grooves 25 and recessed grooves 26 is similar between the first principal surface 12 and the second principal surface 13.

The thickness of the capacitor body 18 is desirably about 0.3 to 1.5 mm.

Dielectric ceramics that constitute the dielectric layers 30 provided in the capacitor body 18 may employ a material that contains $BaTiO_3$, $CaTiO_3$, $SrTiO_3$, $CaZrO_3$, or the like, as a main component. In addition, a material that adds an accessory function, such as a Mn compound, a Fe compound, a Cr compound, a Co compound, and a Ni compound, to any one of these main components may also be used. The thickness of each dielectric layer 30 is desirably about 1 to 10 μm.

A conductive component that constitutes the internal electrodes 31 and 32 may, for example, employ a metal, such as Ni, Cu, Ag, Pd, Ag—Pd alloy, and Au. The thickness of each of the internal electrodes 31 and 32 is desirably about 1 to 10 μm.

A conductive component that constitutes the base layer 22 of each of the external terminal electrodes 19 and 20 may, for example, employ a metal, such as Ni, Cu, Ag, Pd, Ag—Pd alloy, and Au. The base layers 22 are formed using a thick-film conductor made of a sintered metal or formed by direct plating. The base layers 22 may contain a glass or may contain ceramics of the same kind as the ceramics that constitute the dielectric layers 30. The thickness of each base layer 22 is desirably about 5 to 40 μm.

A metal that constitutes the plating film 23 of each of the external terminal electrodes 19 and 20 may, for example, employ Ni, Cu, Sn, Sn—Pb alloy, and Au. A plurality of the plating films 23 may be formed. The thickness of each plating film 23, i.e., each layer, is desirably about 1 to 10 μm. In addition, although not shown in the drawing, a resin layer for reducing stress may be formed between the base layer 22 and the plating film 23.

When the ceramic electronic component according to the embodiment of the invention is buried in a wiring board, at least the surface of the external conductor is desirably formed of Cu. For example, when the monolithic ceramic capacitor 11 according to this embodiment is buried in the wiring board, the plating film 23 that constitutes the outermost layer of each of the external terminal electrodes 19 and 20 is desirably formed of Cu plating. As described in Japanese Unexamined Patent Application Publication No. 2005-064446, the insulating layer of the wiring board is penetrated at the time of burying the ceramic electronic component by a laser beam to form a via hole that reaches the surface of the external terminal electrode. Because Cu plating tends to reflect a laser (particularly, $CO_2$ laser) beam, it is possible to suppress damage to a component by the laser beam.

Next, an example of a manufacturing process of the monolithic ceramic capacitor 11 will be described.

(1) Ceramic green sheets, a conductive paste for internal electrodes and a conductive paste for external terminal electrodes are prepared. These ceramic green sheets and conductive pastes contain binder and solvent. These binder and solvent may employ known organic binder and known organic solvent, respectively.

(2) The conductive paste for internal electrodes is, for example, printed on the ceramic green sheets in a predetermined pattern by screen printing to form a conductive paste film for internal electrodes.

(3) Predetermined numbers of the ceramic green sheets on which the conductive paste film for internal electrodes is printed are laminated, and then predetermined numbers of ceramic green sheets for outer layers, on which no conductive paste for internal electrodes is printed, are further laminated on both upper and lower sides of the laminated ceramic green sheets, thus preparing a raw collective component. The raw collective component is, where necessary, pressure-bonded in the laminated direction by means of isostatic pressing, or the like.

Figure 6:
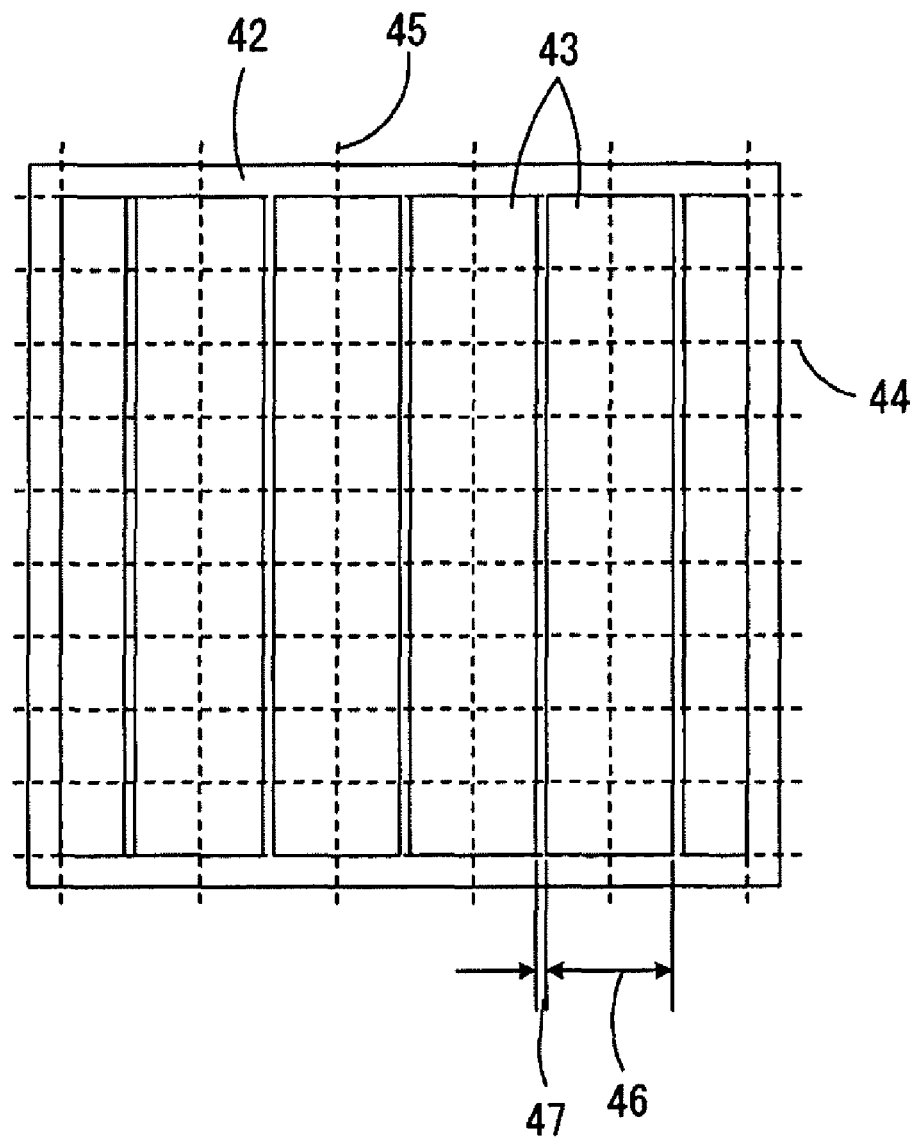
FIG. 6 is a plan view that shows a state where conductive paste films 43 for external terminal electrodes are formed on a first principal surface 42 of a collective component 41 that is prepared for manufacturing the monolithic ceramic capacitor 11 shown in FIG. 1.

(4) As shown in FIG. 6, a conductive paste for external terminal electrodes is printed on the first principal surface 42 of the raw collective component 41 in a predetermined pattern by means of screen printing, or the like, to form a conductive paste film 43 for external terminal electrodes. By breaking the collective component 41 (FIG. 7) along break lines 44 and 45 indicated by broken line, a plurality of the monolithic ceramic capacitors 11 may be obtained from the collective component 41. When viewed from the first principal surface 42 side, the collective component 41 includes first regions 46 that intersect with the conductive paste films 43 for external terminal electrodes in the break lines 44 and second regions 47 that do not intersect with the conductive paste films 43 for external terminal electrodes in the break lines 44.

Conductive paste films for external terminal electrodes are similarly formed on the second principal surface, which is opposite the first principal surface 42 of the raw collective component 41.

Figure 7:
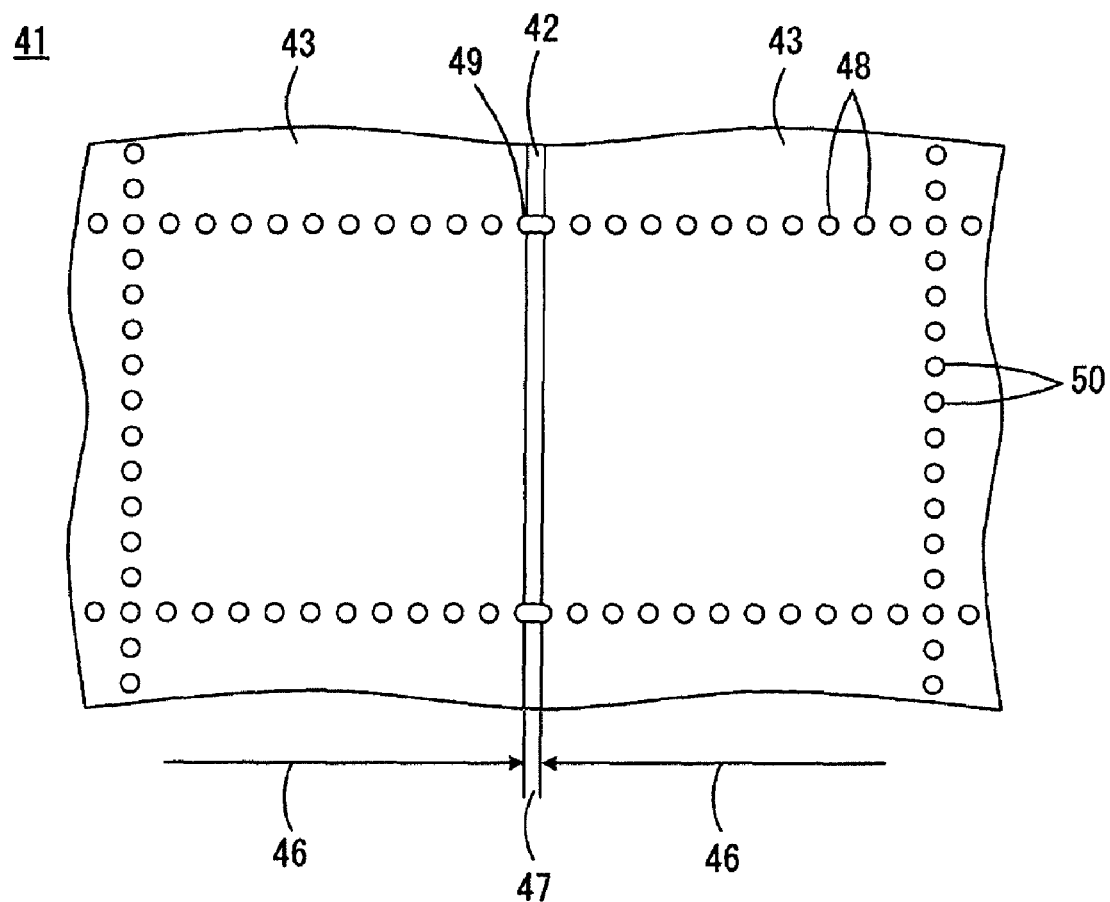
FIG. 7 is an enlarged plan view that shows a state where a plurality of break leading holes 48 to 50 are formed in the collective component 41 shown in FIG. 6.

(5) As shown by the enlarged view in FIG. 7, the plurality of break leading holes 48 to 50 are formed in the collective component 41. The break leading holes 48 to 50 are formed so as to extend in a direction to connect the first principal surface 42 to the second principal surface. In this embodiment, the break leading holes 48 to 50 extend through between the first principal surface 42 and the second principal surface, and open ends of the break leading holes 48 to 50 are located on the first principal surface 42 and the second principal surface. The plurality of break leading holes 48 to 50 are arranged so as to be distributed along the break lines 44 and 55. The plurality of break leading holes 48 to 50 include so-called perforations.

In addition, when the collective component 41 in this embodiment is viewed as a whole, the plurality of break leading holes 48 and 49 are arranged at an irregular pitch in a direction parallel to the first and second side surfaces 14 and 15 of the capacitor body 18 of each monolithic ceramic capacitor 11 to be obtained. That is, although the break leading holes 48 are arranged at a constant pitch and the break leading holes 49 are arranged at a constant pitch, the pitch of the break leading holes 49 is narrower than the pitch of the break leading holes 48. On the other hand, the plurality of break leading holes 50 are arranged at a constant pitch in a direction parallel to the third and fourth side surfaces 16 and 17 of the capacitor body 18.

In addition, the break leading holes 48 to 50 each desirably have the same diameter.

The break leading holes 48 to 50 may be formed using a laser, an NC punch, or the like.

As shown in FIG. 7, when viewed in a direction in which the plurality of break leading holes 48 and 49 are distributed, portions at which the conductive paste films 43 for external terminal electrode are printed are the first regions 46 shown in FIG. 6 and ultimately become the first regions 28 in the monolithic ceramic capacitor 11. The plurality of first break leading holes 48 are formed at the portions.

In FIG. 7, similarly, when viewed in a direction in which the plurality of break leading holes 48 and 49 are distributed, a portion at which no conductive paste film 43 for external terminal electrode is printed is the second region 47 shown in FIG. 6 and ultimately becomes the second region 29 in the monolithic ceramic capacitor 11. The plurality of second break leading holes 49 are formed at the portion.

Figure 10:
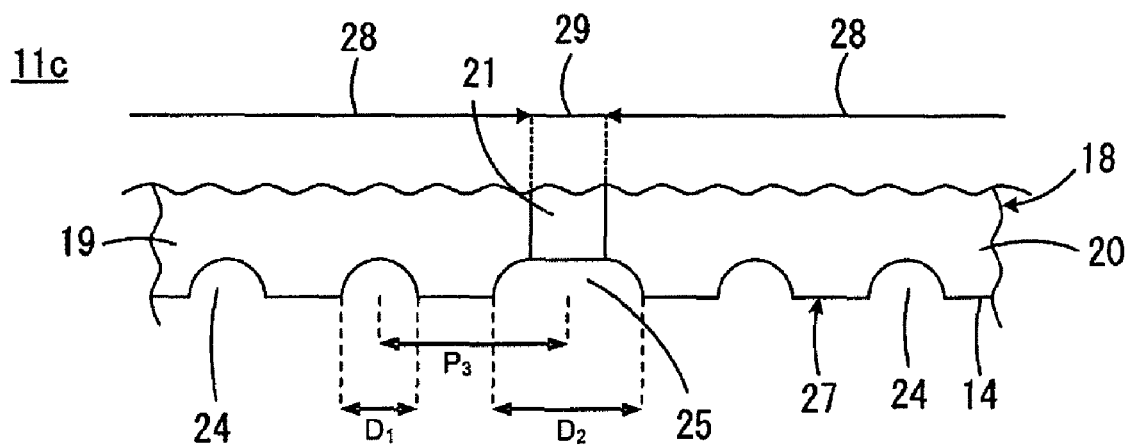
FIG. 10 is a view, corresponding to FIG. 5, for illustrating a fourth embodiment of the invention.

In order to form the second recessed grooves 25 shown in FIG. 5, it is, for example, only necessary that the second break leading holes 49 are formed by repeating laser irradiation at a narrowed irradiation pitch. In addition, it is only necessary that the second break leading holes 49 are formed by moving a laser beam at a predetermined distance while irradiating the laser beam in order to form the second recessed grooves 25 as shown in FIG. 10, which will be described later.

In order to form a break leading hole pinpointed to a gap portion, for example, it is necessary to form a break leading hole by sensing the gap portion each time. Thus, the process time for forming a break leading hole elongates. However, if a plurality of narrow pitch break leading holes or a long breaking hole is formed, even when a position deviation slightly occurs, it is possible to reliably arrange the break leading hole(s) at the gap portion. Thus, it is possible to reduce the process time for forming break leading holes.

(6) The raw collective component 41 is fired. A firing temperature depends on the materials of the ceramic green sheets, the conductive paste for internal electrodes and the conductive paste for external terminal electrodes; however, it is desirably, for example, about 900 to 1300° C. Thus, ceramics contained in the ceramic green sheets and the conductive paste for internal electrodes are sintered to form the capacitor body 18, while the conductive paste for external terminal electrodes is also sintered to form the base layers 22 of the external terminal electrodes 19 and 20 on the capacitor body 18.

(7) Plating is then applied to the collective component 41 to form a plating film 23 on the base layer 22 of each of the external terminal electrodes 19 and 20.

Note that the embodiment of the invention is specifically significant when electrolytic plating is applied. This is because the first and second external terminal electrodes 19 and 20 of each monolithic ceramic capacitor 11 to be obtained are connected to each other in the collective component 41, at portions other than the break leading holes 48 to 50, and the external terminal electrodes may be supplied with electric current only by connecting feeding terminals for electrolytic plating to the first and second external terminal electrodes 19 and 20 of the monolithic ceramic capacitor 11 arranged at the peripheral portion of the collective component 41.

(8) In this state of the collective component 41, the characteristics of the plurality of monolithic ceramic capacitors 11 to be obtained can be respectively measured.

(9) The collective component 41 is divided along the break lines 44 and 45 to obtain the plurality of monolithic ceramic capacitors 11.

Note that the base layers 22 of the external terminal electrodes 19 and 20 may be formed by sintering simultaneously with sintering for obtaining the capacitor body 18 as described above or the base layers 22 may be formed so that, after sintering for obtaining the capacitor body 18, a conductive paste is applied and baked before breaking.

Figure 8:
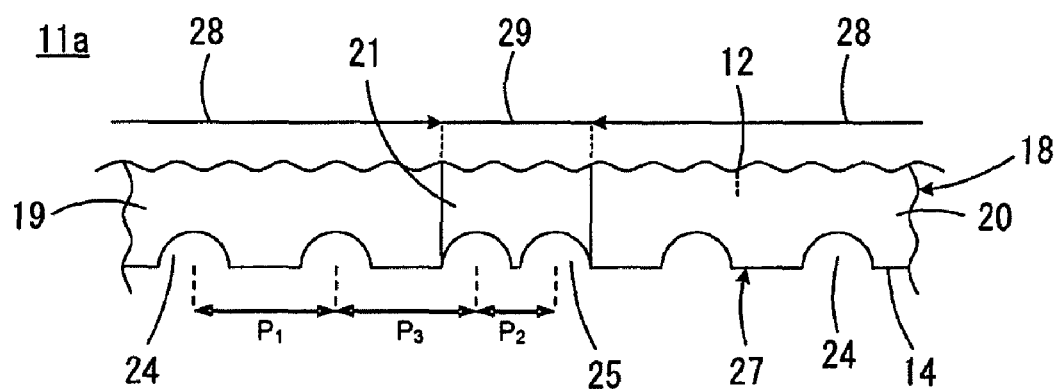
FIG. 8 is a view, corresponding to FIG. 5, for illustrating a second embodiment of the invention.

FIG. 8 is a view, corresponding to FIG. 5, for illustrating a second embodiment of the invention. In FIG. 8, like reference numerals denote components corresponding to the components shown in FIG. 5, and the overlap description is omitted.

In the monolithic ceramic capacitor 11a shown in FIG. 8, the configuration in which the second recessed grooves 25 are formed is different from that shown in FIG. 5. That is, in the monolithic ceramic capacitor 11a, the plurality of second recessed grooves 25 are formed only in the second region 29 and are independent of each other.

In this embodiment as well, when the relationship $P_1 > P_2$ is satisfied, a smooth break is possible and, therefore, it is possible to suppress structural defect.

Figure 9:
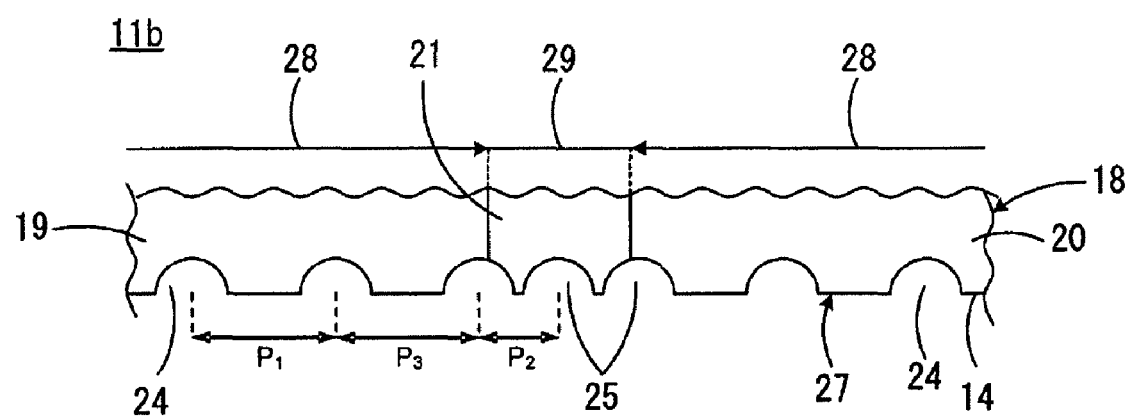
FIG. 9 is a view, corresponding to FIG. 5, for illustrating a third embodiment of the invention.

FIG. 9 is a view, corresponding to FIG. 5, for illustrating a third embodiment of the invention. In FIG. 9, like reference numerals denote components corresponding to the components shown in FIG. 5, and the overlap description is omitted.

In a monolithic ceramic capacitor 11b shown in FIG. 9 as well, the configuration in which the second recessed grooves 25 are formed is characteristic. That is, the plurality of second recessed grooves 25 in the monolithic ceramic capacitor 11b, are formed from the second region 29 partially into the first regions 28 as in the case of FIG. 5; however, the plurality of second recessed grooves 25 are formed independent of one another and are different from those of FIG. 5.

In this embodiment as well, when the relationship $P_1 > P_2$ is satisfied, a smooth break is possible and, therefore, it is possible to suppress structural defect.

FIG. 10 is a view, corresponding to FIG. 5, for illustrating a fourth embodiment of the invention. In FIG. 10, like reference numerals denote components corresponding to the components shown in FIG. 5, and the overlap description is omitted.

In a monolithic ceramic capacitor 11c shown in FIG. 10, the second recessed groove 25 is not formed of a plurality of mutually overlapped continuous recessed grooves but formed of a single independent recessed groove. Where the length of each first recessed groove 24 along the first edge portion 27 is $D_1$, and the length of the second recessed groove 25 along the first edge portion 27 is $D_2$, the relationship $D_1 < D_2$ is satisfied.

In a collective component for obtaining the monolithic ceramic capacitors 11c that satisfy the above condition, a plurality of first break leading holes are formed as break leading holes in regions corresponding to the first regions 28 so as not to reach a region corresponding to the second region 29 which corresponds to a gap 21 portion between the external terminal electrodes 19 and 20 and a second break leading hole is formed as a break leading hole in a region corresponding to the second region 29, and then the length (corresponding to $D_2$) of the second break leading hole along a break line is longer than the length (corresponding to $D_1$) of the first break leading hole along a break line.

Thus, in this embodiment as well, a smooth break is possible and, therefore, it is possible to suppress structural defect.

Note that in this embodiment also, as in the case of the first embodiment, the length $D_1$ of each first recessed groove 24 is desirably about 80 to 120 μm, the length $D_2$ of the second recessed groove 25 is desirably about 160 to 240 μm, the pitch $P_1$ of the first recessed grooves 24 is desirably about 150 to 250 μm, the pitch $P_3$ between the adjacent first recessed groove 24 and second recessed groove 25 is desirably about 150 to 250 μm, the size G of the gap 21 corresponding to the length of the second region 29 is desirably about 140 to 160 μm, the relationship $D_1 < G$ is desirably satisfied, and the relationship $D_2 \geq G$ is desirably satisfied.

Figure 11:
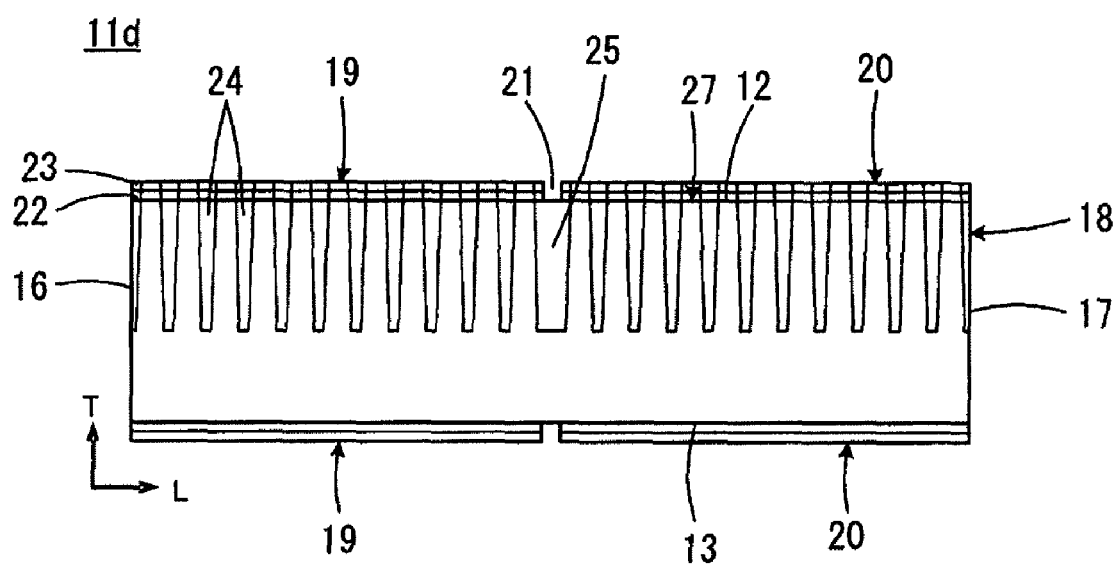
FIG. 11 is a view, corresponding to FIG. 2, for illustrating a fifth embodiment of the invention.

FIG. 11 is a view, corresponding to FIG. 2, for illustrating a fifth embodiment of the invention. In FIG. 11, like reference numerals denote components corresponding to the components shown in FIG. 2, and the overlap description is omitted.

In a monolithic ceramic capacitor 11d shown in FIG. 11, the first and second recessed grooves 24 and 25 are formed so as to reach only the first principal surface 12 and not to reach the second principal surface 13.

In a collective component for obtaining the monolithic ceramic capacitors 11d having the above configuration, the first and second break leading holes are formed so as not to reach the second principal surface. For example, if a large number of perforated break leading holes are formed, breaking is easy, whereas there is a problem that a collective component can be unintentionally broken while handling the collective component in a manufacturing process. In contrast, by forming the break leading holes in a half-perforated state, it is possible to suppress an undesirable break of a collective component when handling the collective component.

In addition, the first and second recessed grooves 24 and 25 may have a tapered shape in cross section as shown in FIG. 11. For example, when break leading holes, which will be the first and second recessed grooves 24 and 25, are formed by a laser beam, because of the attenuation of the energy of the laser beam, the intensity of laser beam weakens as the location becomes distanced from the incident position. As a result, break leading holes have a tapered shape. Note that a tapered shape may be not only applied to the case of half-perforated break leading holes but also applied to the case of completely perforated break leading holes that correspond to the recessed grooves 24 and 25 as shown in FIG. 2.

Figure 12A:
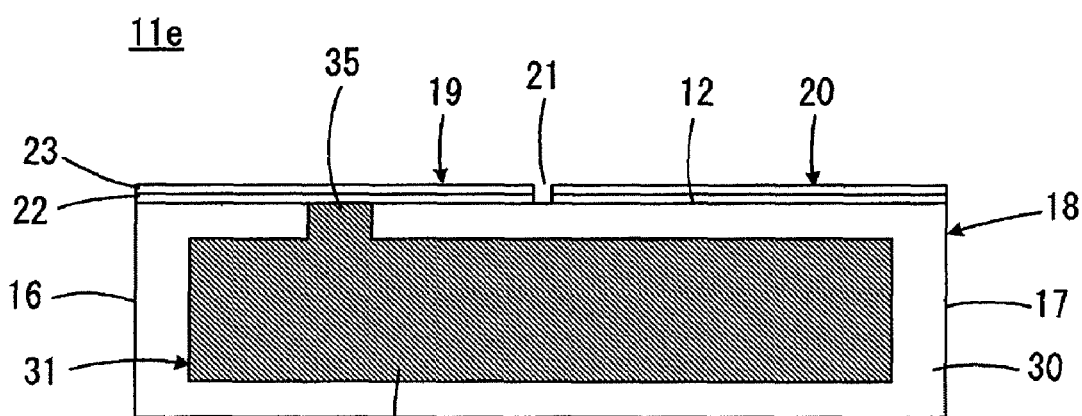
Figure 12B:
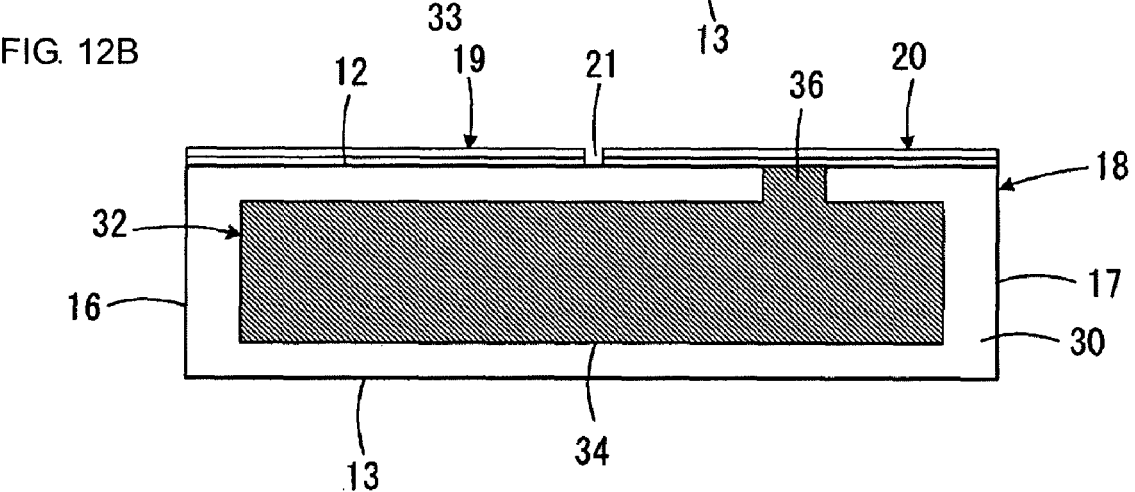

FIG. 12A and FIG. 12B are views, corresponding to FIG. 3A and FIG. 3B, for illustrating a sixth embodiment of the invention. In FIG. 12A and FIG. 12B, like reference numerals denote components corresponding to the components shown in FIG. 3A and FIG. 3B, and the overlap description is omitted.

In a monolithic ceramic capacitor 11e shown in FIG. 12A and FIG. 12B, the first and second external terminal electrodes 19 and 20 are formed only on the first principal surface 12. In this type of monolithic ceramic capacitor 11e as well, the embodiment of the invention can effectively function.

Figure 13:
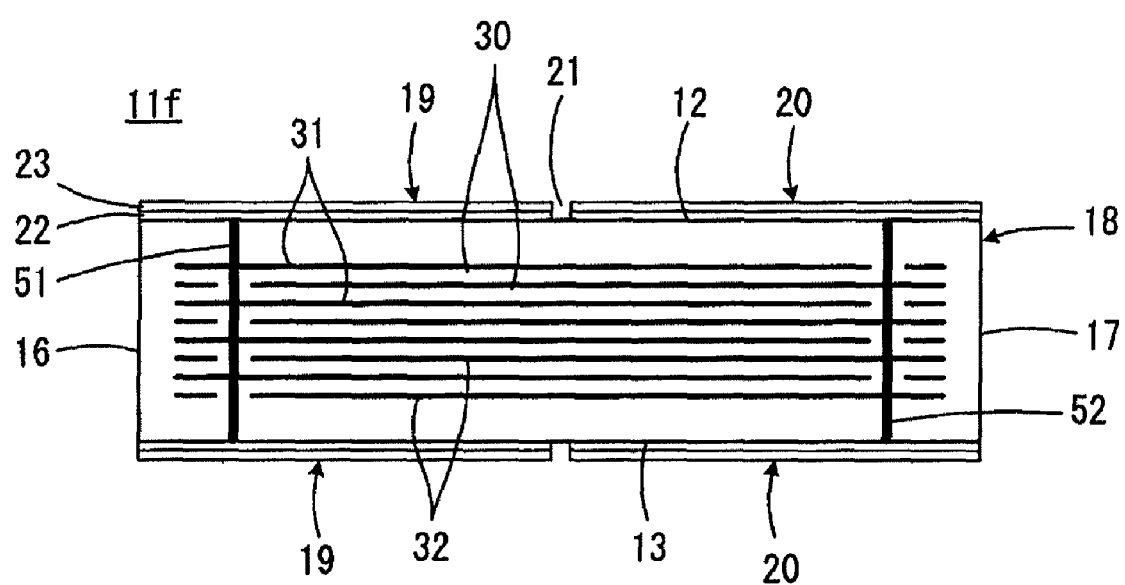
FIG. 13 is an LT cross-sectional view of a monolithic ceramic capacitor 11f for illustrating a seventh embodiment of the invention.
Figure 14A:
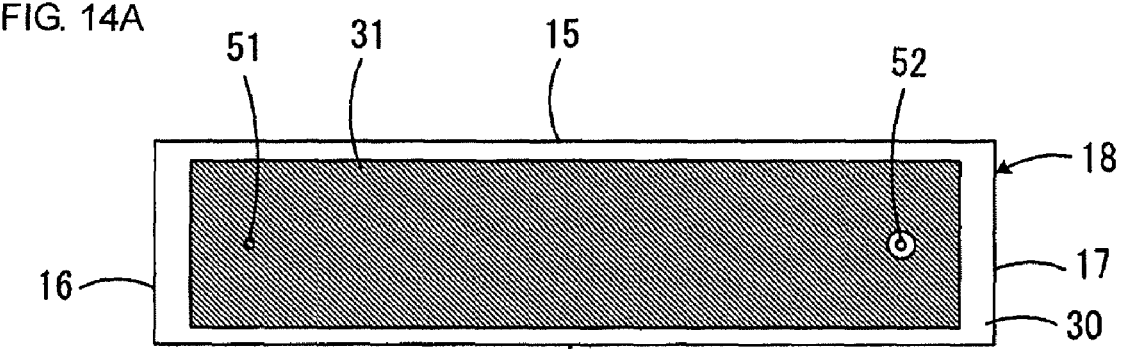
Figure 14B:
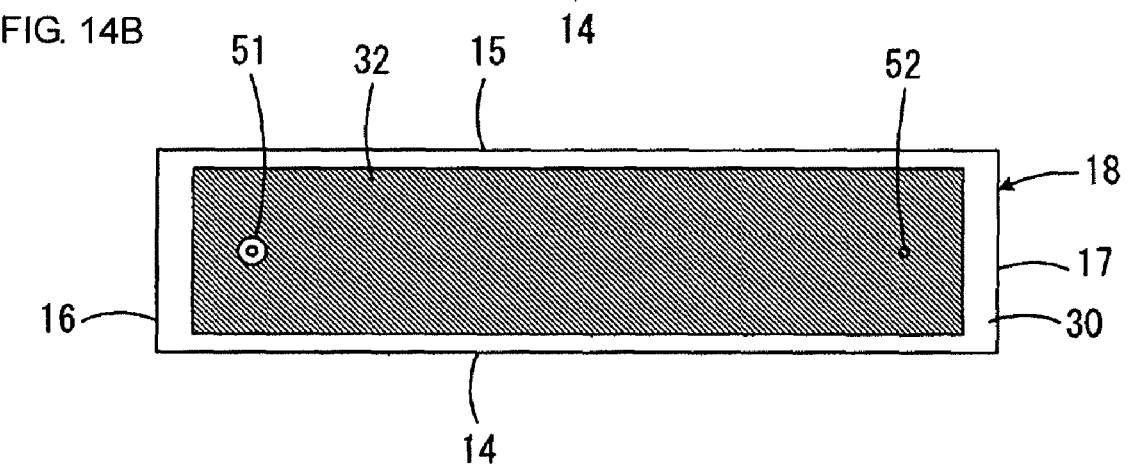

FIG. 13, FIG. 14A and FIG. 14B are views for illustrating a seventh embodiment of the invention, in which FIG. 13 is a LT cross-sectional view like FIG. 3A and FIG. 3B, and FIG. 14A and FIG. 14B are LW cross-sectional views. In addition, FIG. 14A and FIG. 14B show different cross sections from each other. In FIG. 13, FIG. 14A and FIG. 14B, like reference numerals denote components corresponding to the components shown in FIG. 3A, FIG. 3B, and the like, and the overlap description is omitted.

In a monolithic ceramic capacitor 11f shown in FIG. 13, FIG. 14A and FIG. 14B, the dielectric layers 30 and the first and second internal electrodes 31 and 32 extend parallel to the first principal surface 12, that is, to a mounting surface, the first external terminal electrode 19 is electrically connected to the first internal electrodes 31 via a first via conductor 51, and then the second external terminal electrode 20 is electrically connected to the second internal electrodes 32 via a second via conductor 52.

In this type of monolithic ceramic capacitor 11f as well, the embodiment of the invention can effectively function.

The embodiments of the invention are described in relation to a monolithic ceramic capacitor; the embodiments of the invention may also be applied to a ceramic electronic component other than the monolithic ceramic capacitor.

FIG. 15 is a view, corresponding to FIG. 1, for illustrating an eighth embodiment of the invention. In FIG. 15, like reference numerals denote components corresponding to the components shown in FIG. 1, and the overlap description is omitted.

The ceramic electronic component 55 shown in FIG. 15 is not limited to the one that constitutes a monolithic ceramic capacitor. The ceramic electronic component 55 includes a ceramic element assembly 56 that corresponds to the above described capacitor body 18. An external conductor 58 formed on a first principal surface 57 of the ceramic element assembly 56 includes first and second conductive portions 59 and 60 and a connecting portion 61 that connects these first and second conductive portions 59 and 60. The connecting portion 61 has a relatively narrow width, and, as a result, first and second cutout portions 64 and 65 are respectively formed at a first side surface 62 side and a second side surface 63 side opposite to the first side surface 62 in the first principal surface 57.

In this embodiment as well, at least two first regions 28 and at least one second region 29 are formed at a first edge portion 66 of the first principal surface 57, which contacts the first side surface 62. An edge of the external conductor 58 is located in the at least two first regions 28. The at least one second region 29 is located between the adjacent two first regions 28, and an edge of the external conductor 58 is not located in the at least one second region 29. Then, the first recessed grooves 24 are formed in each first region 28, and the second recessed grooves 25 are formed in each second region 29.

Hereinafter, an experimental example that is carried out to examine the advantageous effects of the embodiments of the invention will be described.

On the basis of the above described manufacturing process, monolithic ceramic capacitors, which are samples according to an example and a comparative example, were prepared. The design of the monolithic ceramic capacitors, which serve as samples according to the example and comparative example, are as shown in the following Table 1.

TABLE 1

| DIELECTRIC CERAMIC MATERIAL | CERAMICS CONTAINING $BaTiO_3$ AS MAIN COMPONENT |
|---|---|
| THICKNESS OF DIELECTRIC LAYER | 2 μm |
| MATERIAL OF INTERNAL ELECTRODE | Ni |
| THICKNESS OF INTERNAL ELECTRODE | 1 μm |
| MATERIAL OF BASE LAYER OF EXTERNAL TERMINAL ELECTRODE | Ni |

TABLE 1-continued

| DIELECTRIC CERAMIC MATERIAL | CERAMICS CONTAINING $BaTiO_3$ AS MAIN COMPONENT |
|---|---|
| THICKNESS OF BASE LAYER OF EXTERNAL TERMINAL ELECTRODE | 5 μm |
| MATERIAL OF PLATING FILM OF EXTERNAL TERMINAL ELECTRODE | Cu |
| THICKNESS OF PLATING FILM OF EXTERNAL TERMINAL ELECTRODE | 5 μm |

To obtain the above described monolithic ceramic capacitor, a collective component according to each of the example and the comparative example was prepared. In the firing for obtaining these collective components, the top temperature was set at about 120° C. and maintained in the firing furnace for 25 hours, and the firing atmosphere was set to a reducing atmosphere. 36 monolithic ceramic capacitors were obtained from each collective component.

Figure 16:
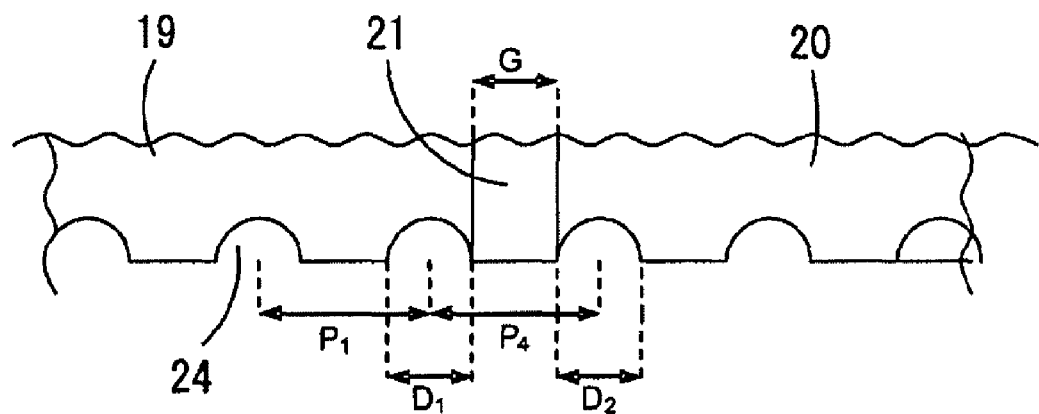
FIG. 16 is a view, corresponding to FIG. 5, showing a monolithic ceramic capacitor according to a comparative example, which is prepared in an experimental example.
Figure 17:
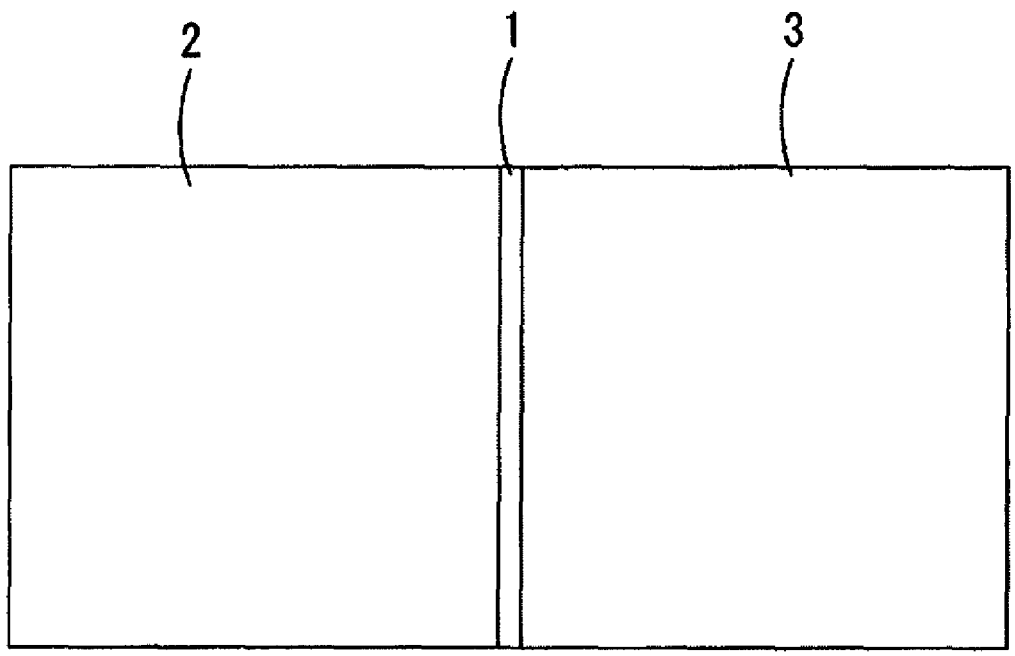
FIG. 17 is a plan view that shows an existing ceramic electronic component that is designed to increase areas of external terminal electrodes 2 and 3 as much as possible.

When the sizes of various portions, such as recessed grooves, which are formed in each monolithic ceramic capacitor that is obtained by breaking the above collective component are shown in measurements of various portions shown in FIG. 5 in the example and measurements of various portions shown in FIG. 16 in the comparative example, the sizes were as shown in the following Table 2.

TABLE 2

|  | EXAMPLE (FIG. 5) | COMPARATIVE EXAMPLE (FIG. 16) |
|---|---|---|
| $D_1$ | 100 | 100 |
| $D_2$ | 200 | 100 |
| $P_1$ | 170 | 170 |
| $P_2$ | 50 | — |
| $P_3$ | 170 | — |
| $P_4$ | — | 170 |
| G | 150 | 150 |

(UNIT: μm)

The appearances of the obtained monolithic ceramic capacitors according to the example and the comparative example were checked through a microscope. There was no monolithic ceramic capacitor in which a break defect occurs among the obtained monolithic ceramic capacitors in the example. On the other hand, a break defect was identified in three monolithic ceramic capacitor among the obtained 36 monolithic ceramic capacitors in the comparative example.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A ceramic electronic component comprising:
a ceramic element assembly having opposing first and second principal surfaces and first to fourth side surfaces each of which connects the first and second principal surfaces; and
an external conductor on the first principal surface of the ceramic element assembly; and a plurality of recessed grooves on the first side surface extending from the first principal surface toward the second principal surface, wherein
a first edge portion of the first principal surface which contacts the first side surface has two first regions in which an edge of the external conductor is disposed; and a second region which is located between the two first regions and in which an edge of the external conductor is not disposed, and wherein
the plurality of recessed grooves comprise a plurality of first recessed grooves disposed only in the two first regions having a pitch $P_1$ and each of the plurality of first recessed grooves along the first edge portion having a length $D_1$; and a second recessed groove in the second region having a length $D_2$ along the first edge portion;
wherein (a) there are a plurality of second recessed grooves having a pitch $P_2$ such that either all second recessed grooves are disposed only in the second region or a second recessed groove is disposed so as to have a portion in both the second region and a first region, and $P_1 > P_2$, or (b) $D_1 < D_2$.

2. The ceramic electronic component according to claim 1, wherein there are two adjacent second recessed grooves which partially overlap each other.

3. The ceramic electronic component according to claim 1, wherein no adjacent second recessed grooves which overlap each other.

4. The ceramic electronic component according to claim 1, wherein
the external conductor comprises a first external conductor having an edge disposed in one of the two first regions and a second external conductor having an edge disposed in the other of the two first regions, and wherein
the first external conductor and the second external conductor do not touch each other.

5. The ceramic electronic component according to claim 1, wherein
the ceramic electronic component constitutes a monolithic ceramic capacitor that includes a plurality of laminated dielectric layers and first and second internal electrodes which face each other across a dielectric layer,
the first external conductor is electrically connected to the first internal electrode, and
the second external conductor is electrically connected to the second internal electrode.

6. The ceramic electronic component according to claim 5, wherein the dielectric layers and the first and second internal electrodes extend vertically with respect to the first principal surface.

7. The ceramic electronic component according to claim 5, wherein
the dielectric layers and the first and second internal electrodes extend parallel to the first principal surface,
the first external conductor is electrically connected to the first internal electrode by a first via conductor, and
the second external conductor is electrically connected to the second internal electrode by a second via conductor.

8. The ceramic electronic component according to claim 1, wherein the plurality of recessed grooves extend from the first principal surface to the second principal surface.

9. The ceramic electronic component according to claim 1, wherein the plurality of recessed grooves do not extend to the second principal surface.

10. The ceramic electronic component according to claim 1, wherein the pitch between adjacent first and second recessed grooves is smaller than the pitch $P_1$ of the first recessed grooves.

11. The ceramic electronic component according to claim 1, wherein an external conductor is on the second principal surface.

12. The ceramic electronic component according to claim 11, wherein the first principal surface has a second edge portion which contacts a side surface opposite the first side surface and has the same region configuration as the first edge portion.

13. The ceramic electronic component according to claim 1, wherein $D_1 < D_2$, $D_1 < G$ and $D_2 \geq G$, where G is the length of the second region along the first edge portion.

14. The ceramic electronic component according to claim 1, wherein a surface of the external conductor comprises Cu.

15. The ceramic electronic component according to claim 14, wherein
the ceramic electronic component constitutes a monolithic ceramic capacitor that includes a plurality of laminated dielectric layers and first and second internal electrodes which face each other across a dielectric layer.

16. A collective component from which a plurality of ceramic electronic components may be obtained by dividing the collective component along a predetermined break line, comprising:
mutually opposing first and second principal surfaces; and
an external conductor on the first principal surface,
a plurality of break leading holes having an open end on the first principal surface and extending in a direction to connect the first and second principal surfaces,
wherein the plurality of break leading holes are arranged to form a break line,
wherein the collective component, when the collective component is viewed from a side of the first principal surface, having a first region that intersects with external conductor in the break line and a second region that does not intersect the external conductor in the break line,
wherein the plurality of break leading holes comprise a plurality of first break leading holes disposed in the first region so as not to reach the second region and having a pitch $P_1$, and a plurality of second break leading holes having a pitch $P_2$ such that they are disposed only in the second region or have portions in both the first and second regions, and wherein
$P_1 > P_2$.

17. A method of manufacturing a ceramic electronic component, comprising providing a collective component according to claim 16, and dividing said collective component along the break line to form a plurality of ceramic electronic components.

18. A collective component from which a plurality of ceramic electronic components may be obtained by dividing the collective component along a predetermined break line, comprising:
mutually opposing first and second principal surfaces; and
an external conductor on the first principal surface,
a plurality of break leading holes having an open end on the first principal surface extending in a direction to connect the first and second principal surfaces, wherein
the plurality of break leading holes are arranged to be distributed along a break line, wherein
the collective component, when the collective component is viewed from a side of the first principal surface, has a first region that intersects the external conductor in the break line and a second region that does not intersect the external conductor in the break line, wherein
the plurality of break leading holes comprises a plurality of first break leading holes that disposed in the first region so as not to reach the second region and a second break leading hole disposed in the second region, and wherein
the length of the second break leading hole along the break line is longer than the length of each of the first break leading holes along the break line.

19. A method of manufacturing a ceramic electronic component, comprising providing a collective component according to claim 18, and dividing said collective component along the break line to form a plurality of ceramic electronic components.

* * * * *